Patented Oct. 25, 1949

2,485,764

UNITED STATES PATENT OFFICE 2,485,764

ALPHA-AMINOANTHRAQUINONE COMPOUNDS

James Ogilvie, Buffalo, N. Y., assignor to Allied Chemical & Dye Corporation, New York, N. Y., a corporation of New York No Drawing. Application July 31, 1946, Serial No. 687,516

5 Claims. (Cl. 260—378)

This invention relates to aminoanthraquinone compounds of the water-insoluble type. It relates more particularly to a new class of compounds within the field of aminoanthraquinones of the water-insoluble type having at least one carbocycloamino radical as a substituent in an alpha-position of the anthraquinone nucleus. (As employed herein, the term "carbocyclo" denotes and includes aryl, hydroaryl and alicyclic radicals containing homocyclic carbon rings.)

Aminoanthraquinone compounds having dyeing properties are of two general types: (1) the water-soluble type, containing a sulfonic or carboxylic acid group, which are particularly useful for dyeing wool; and (2) the water-insoluble type, containing no sulfonic or carboxylic acid group, which are useful for dyeing cellulose acetate, nylon, resins and waxes and for coloring gasoline. The compounds of the present invention are of the latter type.

1-aminoanthraquinones containing a substituent in the amino group and a hydroxyl group or an amino group in the 4-position, and 1,4-di-amino-anthraquinone compounds containing a substituent in each of the amino groups are known for use as dyes for cellulose acetate, nylon, resins, candles and for coloring gasoline. Thus, 1-methylamino-4-ethylamino-anthraquinone, 1-methylamino-4-p-tolylamino-anthraquinone, 1,4-di(p-tolylamino)-anthraquinone, and 1,4-di(amylamino)-anthraquinone have heretofore been proposed for the dyeing of cellulose acetate and nylon fibers and for the coloring of gasoline.

Aminoanthraquinones are also known in which a carbocycloamino radical is present in one or both of the 1- and 4-positions of the anthraquinone nucleus. Thus, U. S. Patent 1,960,564 discloses 1,4-diaminoanthraquinones having a biphenyl radical as a substituent of each of the amino groups; and U. S. Patent 2,042,757 discloses 1,4-diaminoanthraquinones having a 4'-cyclohexylphenyl radical as a substituent of each of the amino groups. While such aminoanthraquinones upon sulfonation are converted to dyestuffs for wool, in the unsulfonated form they do not possess adequate solubility in organic solvents nor proper color characteristics to render them suitable for such uses as dyeing cellulose acetate and coloring gasoline.

According to the present invention, aminoanthraquinone compounds of the water-insoluble type are provided having improved tinctorial properties and/or improved solubility in water-immiscible organic solvents, as a result of which they are particularly valuable for the coloring of oils, waxes, stains, lacquers, varnishes, plastics, organic derivatives of cellulose, nylon, and related substances.

The compounds of the present invention are 1,4-disubstituted anthraquinones having a bicyclohexylamino radical (that is, a cyclohexyl-cyclohexylamino radical: a dodecahydrobiphenylamino radical) as the substituent in the 1-position of an anthraquinone nucleus which is unsubstituted in the 2- and 3-positions, and having a bicyclohexylamino radical (or a hydroxyl, amino, alkylamino, or other carbocycloamino radical) as the substituent in the 4-position of the anthraquinone nucleus. The alkylamino radical may be a substituted alkylamino radical; e. g., benzylamino ($C_6H_5$—$CH_2$—NH—), beta-hydroxyethylamino (HO—$C_2H_4$—NH—), etc. The 5-, 6-, 7-, and 8-positions of the anthraquinone nucleus may all be unsubstituted, or one or two of them may be substituted by a radical of the group consisting of the hydroxyl radical and the unsubstituted and substituted amino radicals.

Thus the compounds of the present invention may be represented by the following general formula

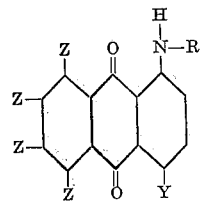

in which R represents a bicyclohexyl radical; Y represents a radical selected from the group consisting of hydroxyl, amino, alkylamino, and carbocycloamino radicals (which may be substituted); and Z represents hydrogen or a hydroxyl or amino radical, at least two Z's being hydrogen.

I have discovered that 1,4-disubstituted anthraquinone compounds of said type have superior properties as compared with the known compounds. As a result, they can be employed for many purposes for which the known compounds are not suitable.

Thus the dyestuffs of the present invention are generally insoluble or difficultly soluble in water; are soluble in organic solvents of the type of acetone, ethyl acetate, benzene, toluene, and light petroleum distillates (e. g., gasoline); and possess affinity for resins of various types (including natural resins and cellulose acetate and other synthetic resins) yielding bright-blue to green colorations.

Preferred compounds of the present invention are 1,4-diamino-anthraquinones having a bicyclohexylamino radical as each of the amino substituents in the 1- and 4-positions of the anthraquinone nucleus.

In the compounds of the present invention, the imino bridge (i. e., —NH—) which joins the anthraquinone nucleus to the bicyclohexyl nucleus can be attached to an ortho- or para-position of the bicyclohexyl nucleus; that is, the bicyclohexylamino radical may be a derivative of completely hydrogenated ortho- or para-aminobiphenyl. Those compounds which are ortho-bicyclohexylamino derivatives are preferred.

In general, the dyestuffs of the present invention are distinguished by brighter shades and/or superior solubility in organic solvents of the above type, as compared with known related 1,4-disubstituted aminoanthraquinone having other hydroarylamino radicals as the amino substituents in the 1- and 4-positions of the anthraquinone nucleus. As compared with 1,4-disubstituted anthraquinones having acyclic alkylamino radicals as the substituents in the 1- and 4-positions of the anthraquinone nucleus, the dyestuffs of the present invention are generally brighter and greener in shade and faster to light. Further, as compared with corresponding 1,4-disubstituted aminoanthraquinones having arylamino radicals as the amino substituents in the 1- and 4-positions of the anthraquinone nucleus, the dyestuffs of the present invention are generally brighter and bluer in shade and more soluble in organic solvents, especially light petroleum distillates.

For example, 1,4-di(ortho-bicyclohexylamino)-anthraquinone, the product of Example 1 below, has excellent solubility in benzene, toluene, and light petroleum distillates (to which it imparts strong, bright greenish-blue colorations), and dissolves readily in gasoline to give greenish-blue solutions which are outstandingly fast to sunlight. As compared with the related 1,5-di(cyclohexylamino)-anthraquinone, 1,4-di(cyclohexylphenylamino)-anthraquinone, and 1,4-di(biphenylamino)-anthraquinone, it is brighter and bluer in shade, is much more soluble in hydrocarbon solvents, especially light petroleum distillates, and it produces solutions which are much brighter and generally have greater color strength.

The compounds of the present invention can be prepared in a number of ways. A process generally suitable for their manufacture involves condensing a bicyclohexylamine (that is, a fully hydrogenated aminobiphenyl) with a leuco derivative of a 1,4-disubstituted anthraquinone having a hydroxyl or amino group as the substituent in the 1- position of an anthraquinone nucleus which is unsubstituted in the 2- and 3-positions, and having a hydroxyl, amino, alkylamino, or carbocycloamino radical as the substituent in the 4-position of said anthraquinone nucleus.

The reaction may be carried out in a manner similar to those known for preparation of known substituted amino-anthraquinones; for example, by heating the reactants in the presence of a liquid solvent or diluent (e. g., ethyl alcohol, chlorobenzene, cresylic acid, etc.). As ordinarily obtained, the products are in the form of leuco compounds and are oxidized to the final 1,4-disubstituted anthraquinones by a suitable treatment.

When the leuco anthraquinone compound employed is derived from a 1,4-dihydroxyanthraquinone, a 1-amino-4-hydroxyanthraquinone, or a 1,4-diamino-anthraquinone (for example, leuco quinizarine, leuco 1,4,5,8-tetrahydroxyanthraquinone, or leuco 1,4-diamino-anthraquinone), sufficient bicyclohexylamine may be employed to form the di-bicyclohexylamino derivative of the anthraquinone (namely, at least 2 mols, and preferably more than 2 mols, of bicyclohexylamine per mol of the leuco anthraquinone compound); or the leuco anthraquinone compound may be reacted first with substantially one molecular proportion of bicyclohexylamine, so as to replace only one of the substituents in the 1- and 4-positions of the anthraquinone nucleus, and the resulting leuco monobicyclohexylamino-anthraquinone compound may be reacted with another amine (for example, an alkylamine or an isomer of the bicyclohexylamine previously employed). The compounds of the latter type may also be obtained by heating the leuco anthraquinone compound with a mixture of a bicyclohexylamine and another amine adapted to condense with a leuco anthraquinone compound.

The oxidation of the leuco 1,4-disubstituted anthraquinones obtained in the course of the process referred to above may be effected in various ways, a number of which are known for oxidizing leuco derivatives of 1,4-diamino-anthraquinones to the oxidized form; for example, by heating with oxidizing agents (such as, nitrobenzene, nitrosobenzene, nitrosophenols, sodium perborate, etc.) in the presence or absence of alkalies, solvents, or diluents.

The bicyclohexylamino-anthraquinones obtained in the above manner may be purified, if desired, by extraction with, or crystallization from, suitable organic solvents; or by extraction or washing with aqueous mineral acid solutions and/or with aqueous alkali solutions.

The invention will be illustrated by the following specific examples in which parts and percentages are by weight and temperatures are in degrees centigrade. Unless otherwise indicated, "alcohol" refers to 2B denatured ethyl alcohol.

*Example 1*

A mixture of 60 parts of ortho-bicyclohexylamine (2-amino-1-cyclohexyl-cyclohexane), 30 parts of leuco-quinizarine, and 120 parts of alcohol is heated with agitation to boiling (about 80°), and boiled under reflux for 16 hours. The reaction mass is allowed to cool to 30° and then filtered, and the filter cake is washed with 80 parts of alcohol. The leuco-anthraquinone compound thus produced is oxidized to the dyestuff by mixing the washed filter cake with 150 parts of alcohol, 22 parts of nitrobenzene and 3.3 parts of sodium hydroxide (caustic soda flakes), and gradually heating the resulting mixture with agitation to 130° while recovering alcohol which distills from the mass. The residual mixture is agitated under reflux (130° to 135°) for 16 hours to complete the oxidation of the leuco compound. The reaction mass is then cooled to 80° and mixed with the recovered alcohol (300 parts), and the resulting mixture is refluxed (about 80°) for about an hour and then cooled to 30°. The dyestuff thus precipitated is separated as a cake by filtration, and the cake is washed with 80 parts of alcohol.

To purify the resulting dyestuff, the washed filter cake is mixed with 800 parts of water, 1 part of Nacconol FSNO (a commercial wetting and dispersing agent of the higher alkyl aryl sulfonate type) and 38 parts of 20° Bé. hydrochloric acid. The slurry thus obtained is agitated and heated to 60° for one hour, then filtered hot, and the filter cake is washed with hot water until neutral to Congo red paper. The washed filter-cake is mixed with 280 parts of water and 11 parts of 50° Bé. caustic soda solution, and the resulting slurry is agitated and heated to 70° to 80° for about one hour. The mass is filtered without cooling, and the filter-cake is washed with hot water until neutral to Brilliant Yellow paper. The washed cake is dried at 70° to 80° and ground.

The dyestuff, thus obtained in the form of a bright, fluffy, blue powder, corresponds with the following formula:

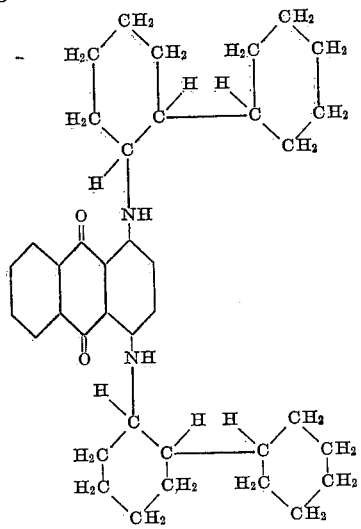

It is substantially insoluble in water and aqueous alkalies; dissolves in concentrated sulfuric acid, forming a wine-red solution which gives a blue precipitate on dilution with water; and is slightly soluble in methyl alcohol and in ethyl alcohol. It is soluble in aromatic solvents (benzene, toluene, etc.), petroleum solvents (mineral oil, light petroleum distillates, gasoline, etc.), ethyl acetate, acetone, Carbitol, Cellosolve, candle wax (a mixture of equal parts of stearic acid and paraffin wax), cellulose nitrate lacquer, Vinylite (polyvinyl chloride) lacquer, and in plastics and resins comprising cellulose acetate, phenol-formaldehyde resins, and/or Koroseal (modified polyvinyl chloride), yielding brilliant greenish-blue solutions or colorations. Its solubility in benzene, toluene, ethyl acetate, mineral oil, Skellysolve B (a light petroleum distillate, boiling from 140° to 160° F., essentially normal hexane), and gasoline is outstanding. It possesses excellent fastness to light: in a candle wax consisting of equal parts of stearic acid and paraffin wax, its fastness to sunlight, and to prolonged heating is excellent; the fastness to light of "pourouts" obtained by pouring 2% solutions of the dyestuff in benzene onto glazed paper and filter paper in excellent; and the fastness to sunlight of solutions of the dyestuff in gasoline is outstanding. By virtue of its good solubility in gasoline, the intense, brilliant, greenish-blue shades which it imparts to such solutions, and its outstanding fastness to sunlight in such solutions, the dyestuff is especially suited for coloring gasoline.

*Example 2*

A mixture of 50 parts of ortho-bicyclohexylamine, 12½ parts of leuco-1,4,5,8-tetrahydroxyanthraquinone and 50 parts of alcohol is heated with agitation to boiling, and boiled under reflux for 16 hours. The reaction mass is then cooled to 25° and filtered, and the filter cake is washed with 40 parts of alcohol. The leuco-anthraquinone compound thus produced is oxidized to the dyestuff by mixing the filter cake with 60 parts of alcohol, 9 parts of nitrobenzene, and 1½ parts of sodium hydroxide (solid caustic soda), heating the resulting mixture to 130° while collecting the alcohol which distills from the mass, and then stirring at 130° for 16 hours to complete the oxidation. After cooling to 80°, the mass is mixed with the recovered alcohol, and the alcoholic mixture is stirred and refluxed at 80° for about 1 hour, cooled to 25°, and filtered. The filter cake is washed with 4 parts of alcohol, dried, and ground.

The dyestuff, thus obtained in the form of a greenish-blue powder, corresponds with the following formula:

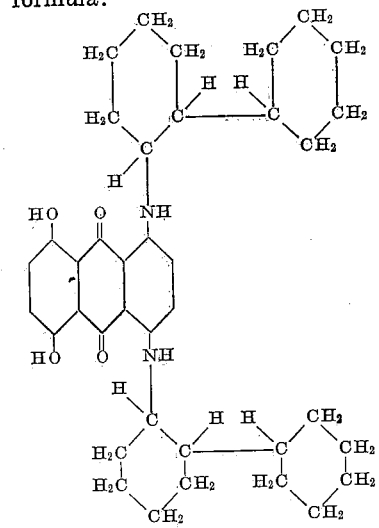

It is insoluble in water; dissolves in concentrated sulfuric acid, forming a strongly colored, violet solution; and possesses excellent solubility in benzene and Skellysolve B, forming intense greenish-blue solutions which are somewhat greener than those obtained with the dyestuff of Example 1.

*Example 3*

A mixture of 24 parts of leuco-quinizarine, 20 parts of ortho-bicyclohexylamine and 44 parts of a commercial mixture of ortho-, meta-, and para-cresols (cresylic acid) is heated to 100° to 105° and stirred at that temperature for 16 hours. The leuco-anthraquinone compound thus produced is oxidized to the dyestuff by adding 120 parts of alcohol, 80 parts of 50° Bé. caustic soda solution and sufficient sodium perborate to oxidize the leuco-anthraquinone compound, and the mass is boiled under reflux until such oxidation is completed, as indicated by no further change in color of the reaction mass. The resulting dyestuff is recovered by drowning the reaction mass in water, separating the precipitated dyestuff by filtration, and drying the filter cake. The dried filter cake is extracted with hot alcohol, in which the dyestuff is readily soluble with a violet coloration; the alcoholic extract is cooled to room temperature to precipitate the dyestuff; and the dyestuff is separated by filtration, dried, and ground.

The dyestuff, thus obtained in the form of a violet-black powder, corresponds with the following formula:

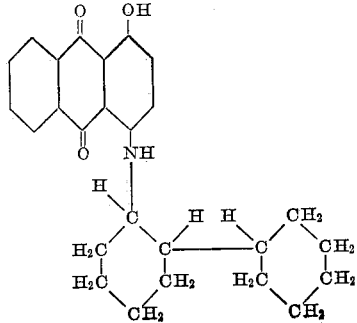

It is insoluble in water; dissolves in concentrated sulfuric acid, forming a yellow solution; and possesses excellent solubility in benzene and Skellysolve B, forming intense reddish-blue solutions which give blue "pour-outs" on filter paper.

*Example 4*

A mixture of 25 parts of leuco-quinizarine, 20 parts of ortho-bicyclohexylamine, 20 parts of 30% aqueous methylamine, 110 parts of alcohol and 60 parts of water is heated to boiling, and boiled under reflux for 6 hours. The leuco-anthraquinone compound thus produced is oxidized to the dyestuff by cooling the reaction mass to 65°, adding 11 parts of para-nitrosophenol, and boiling the resulting mixture under reflux for two hours. The resulting dyestuff is recovered by cooling the reaction mass to room temperature, filtering, and washing the filter cake thus obtained with a mixture of 80 parts of alcohol and 60 parts of water.

The crude dyestuff is purified by slurrying the washed filter-cake with a solution of 30 parts of 50° Bé. caustic soda solution in 400 parts of water; heating the slurry to 80° to 85° for 2 hours; filtering hot; washing the filter-cake free from alkali with water; and drying the resulting filter-cake. The plastic mass of purified dyestuff thus obtained is converted to a more friable form by dissolving it in 730 parts of 100% sulfuric acid at 30°; pouring the solution into 7,000 parts of cold water; filtering; washing the filter-cake with water until acid-free, then with 500 parts of 5% aqueous sodium hydroxide at 60°, and finally with cold water until free from alkali; and drying the washed filter-cake in vacuo at 55°.

The resulting dyestuff, which when ground is a blue powder, consists mainly of 1-ortho-bicyclohexylamino-4-methylamino-anthraquinone, having the following formula:

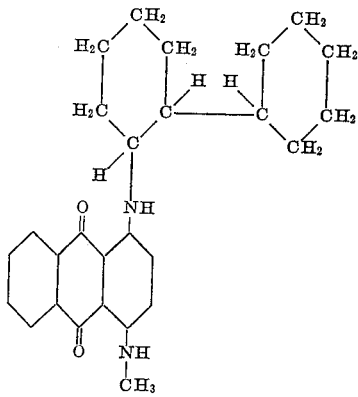

It is insoluble in water; is soluble in concentrated sulfuric acid, forming a reddish-brown solution; and dissolves in benzene, alcohol and Skellysolve B, forming bright, greenish-blue solutions of good tinctorial strength. It is more soluble in alcohol, and yields somewhat duller and less greenish shades of blue, than the dyestuff of Example 1.

It will be evident to those skilled in the art that the invention is not limited to the details of the foregoing examples and that changes may be made without departing from the scope of the invention.

Thus, instead of the leuco anthraquinone compounds employed in the foregoing examples the following leuco anthraquinone compounds may be substituted:

Leuco 1,4-diamino-anthraquinone
Leuco 1,4,5-trihydroxy-anthraquinone
Leuco 1,4,5,6-tetrahydroxy-anthraquinone
Leuco 1,5-dihydroxy-4,8-diamino-anthraquinone
Leuco 4-phenylamino-1-hydroxy-anthraquinone
Leuco 4-beta-hydroxyethylamino-1-hydroxy-anthraquinone
Leuco 4-cyclohexylamino-1-hydroxy-anthraquinone Further, instead of the ortho-bicyclohexylamine employed in the above examples or modifications thereof referred to above, other bicyclohexylamines may be employed; for example, para-bicyclohexylamine.

I claim:

1. An alpha-aminoanthraquinone compound of the water-insoluble type corresponding with the general formula

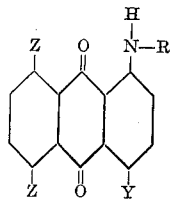

in which R represents the bicyclohexyl radical; Y represents a radical selected from the group consisting of —OH, —$NH_2$ and non-aromatic hydrocarbon-monosubstituted amino radicals; and Z represents a member selected from the group consisting of hydrogen and —OH.

2. 1,4-diamino-anthraquinone having the bicyclohexylamino radical as the amino substituent in the 1-position of the anthraquinone nucleus and a non-aromatic hydrocarbon-monosubstituted amino radical as the amino substituent in the 4-position of the anthraquinone nucleus.

3. 1,4-diamino-anthraquinone having the ortho-bicyclohexylamino radical as the amino substituent in the 1-position of the anthraquinone nucleus and a non-aromatic hydrocarbon-monosubstituted amino radical as the amino substituent in the 4-position of the anthraquinone nucleus.

4. 1,4-di(bicyclohexylamino)-anthraquinone.

5. 1,4-di(ortho-bicyclohexylamino)-anthraquinone, forming a bright blue powder insoluble in water and aqueous alkaline solutions; soluble in concentrated sulfuric acid to give a wine-red solution which gives a blue precipitate on dilution with water; and soluble in benzene, toluene, gasoline, ethylacetate, and acetone to give greenish-blue solutions fast to light.

JAMES OGILVIE.

REFERENCES CITED

The following references are of record in the file of this patent:

UNITED STATES PATENTS

| Number | Name | Date |
|---|---|---|
| 1,960,564 | Zahn | May 29, 1934 |
| 2,042,757 | Zahn | June 2, 1936 |
| 2,050,704 | Koeberle | Aug. 11, 1936 |

FOREIGN PATENTS

| Number | Country | Date |
|---|---|---|
| 46,927 | France | Aug. 11, 1936 |
| 651,430 | Germany | Oct. 13, 1937 |

Certificate of Correction

Patent No. 2,485,764 October 25, 1949

JAMES OGILVIE

It is hereby certified that errors appear in the printed specification of the above numbered patent requiring correction as follows:

Column 3, line 9, for the word "aminoanthraquinone" read *aminoanthraquinones*; line 32, for "1,5-di(cyclohexyl-" read *1,4-di(cyclohexyl-*;

and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*